(12) United States Patent
Zhang et al.

(10) Patent No.: US 10,541,093 B2
(45) Date of Patent: Jan. 21, 2020

(54) CONTROL CIRCUITS FOR SELF-POWERED SWITCHES AND RELATED METHODS OF OPERATION

(71) Applicant: Eaton Intelligent Power Limited, Dublin (IE)

(72) Inventors: Harry Zhang, Shanghai (CN); Andrew Yang, Jiangsu (CN); Alex Zhuang, Shanghai (CN); George Zhang, Shanghai (CN); Tom Xiong, Shanghai (CN); Darron Kirby Lacey, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 304 days.

(21) Appl. No.: 15/427,951

(22) Filed: Feb. 8, 2017

(65) Prior Publication Data
US 2018/0226793 A1 Aug. 9, 2018

(51) Int. Cl.
*H01H 9/16* (2006.01)
*H01H 23/14* (2006.01)

(52) U.S. Cl.
CPC .......... *H01H 9/168* (2013.01); *H01H 23/143* (2013.01); *H01H 2239/078* (2013.01); *H01H 2300/03* (2013.01)

(58) Field of Classification Search
CPC .............................................. H01H 2239/076
See application file for complete search history.

(56) References Cited

U.S. PATENT DOCUMENTS

| | | |
|---|---|---|
| 2,793,265 A | 5/1957 | Crissinger |
| 2,866,873 A | 12/1958 | Lamb |
| 3,170,999 A | 2/1965 | Brown |
| 3,946,347 A | 3/1976 | Sauer |
| 4,091,346 A | 5/1978 | Nishimura et al. |
| 4,292,615 A | 9/1981 | Ohashi |
| 4,344,103 A | 8/1982 | Nagamoto et al. |
| 4,489,297 A | 12/1984 | Haydon et al. |

(Continued)

OTHER PUBLICATIONS

Leviton "No Wires, No Batteries, No Limits: Wireless Sensing Solution" *Product Brochure* (7 pages) (2008).

(Continued)

*Primary Examiner* — Jared Fureman
*Assistant Examiner* — Joel Barnett
(74) *Attorney, Agent, or Firm* — Myers Bigel, P.A.

(57) ABSTRACT

Self-powered switches include a switch housing having an externally accessible user input member, a coil assembly, and a magnet arranged therein such that at least one of the coil assembly and the magnet move relative to each other responsive to movement of the user input member between first and second switch positions, and a control circuit held in the switch housing and coupled to first and second terminals of the coil assembly. The control circuit is configured to detect respective electrical characteristics of the first and second terminals of the coil assembly responsive to the movement of the user input member, and selectively transmit first and second wireless control signals to a remote receiver based on the respective electrical characteristics of the first and second terminals of the coil assembly, respectively. Related circuits and methods of operation are also discussed.

14 Claims, 13 Drawing Sheets

(56) References Cited

U.S. PATENT DOCUMENTS

| | | | |
|---|---|---|---|
| 4,492,942 A | 1/1985 | Mueller | |
| 4,669,804 A | 6/1987 | Munroe | |
| 4,734,669 A | 3/1988 | Maenishi et al. | |
| 5,189,259 A | 2/1993 | Carson et al. | |
| 5,696,350 A | 12/1997 | Anker | |
| 5,895,888 A | 4/1999 | Arenas et al. | |
| 5,934,451 A | 8/1999 | Yu et al. | |
| 6,259,340 B1 | 7/2001 | Fuhr et al. | |
| 6,657,144 B2 | 12/2003 | Savicki, Jr. et al. | |
| 6,891,117 B1 | 5/2005 | Gouhl et al. | |
| 6,911,884 B2 | 6/2005 | Uotome et al. | |
| 6,960,972 B2 | 11/2005 | Nakamura et al. | |
| 7,034,236 B2 | 4/2006 | Endres et al. | |
| 7,084,529 B2 * | 8/2006 | Face | H03K 17/964 307/116 |
| D534,875 S | 1/2007 | Wu | |
| D576,962 S | 9/2008 | Kidman | |
| D583,335 S | 12/2008 | Ni | |
| 7,482,534 B2 | 1/2009 | Ye | |
| 7,595,460 B1 | 9/2009 | Dodal et al. | |
| 7,595,712 B2 | 9/2009 | Nishino et al. | |
| 7,667,155 B1 | 2/2010 | Ni et al. | |
| 7,872,551 B2 | 1/2011 | Nakamura et al. | |
| 7,960,651 B2 | 6/2011 | Alderson et al. | |
| 8,138,872 B2 | 3/2012 | Yoshihara et al. | |
| 8,284,003 B2 | 10/2012 | Klossek et al. | |
| 8,459,812 B2 | 6/2013 | Wu et al. | |
| 8,592,681 B2 | 11/2013 | Alderson et al. | |
| 8,658,893 B1 | 2/2014 | Shotey et al. | |
| 8,674,796 B2 | 3/2014 | Ito et al. | |
| 8,853,893 B2 | 10/2014 | Savicki, Jr. et al. | |
| 8,947,183 B2 | 2/2015 | Yano et al. | |
| D735,378 S | 7/2015 | Mozdzer | |
| 9,240,269 B2 | 1/2016 | Polack et al. | |
| D777,685 S | 1/2017 | Tannous et al. | |
| 9,691,573 B2 | 6/2017 | Dhote et al. | |
| 2004/0174287 A1* | 9/2004 | Deak | G08C 17/02 341/173 |
| 2006/0091984 A1 | 5/2006 | Schmidt | |
| 2009/0078484 A1 | 3/2009 | Kocijan | |
| 2010/0052830 A1 | 3/2010 | Shinoura | |
| 2010/0060394 A1 | 3/2010 | Nagura et al. | |
| 2010/0182109 A1 | 7/2010 | Kuo | |
| 2011/0032059 A1 | 2/2011 | Ito et al. | |
| 2014/0158510 A1 | 6/2014 | Lacey et al. | |
| 2014/0251774 A1 | 9/2014 | Gouhl et al. | |
| 2015/0115967 A1 | 4/2015 | Maier et al. | |
| 2015/0357133 A1 | 12/2015 | Keirstead et al. | |
| 2016/0204686 A1* | 7/2016 | Liu | H02K 35/02 310/17 |

OTHER PUBLICATIONS

Leviton "Self-Powered Lighting Control Solutions by LevNet RF" *Product Brochure* (2 pages) (2010).

Leviton "Self-Powered Wireless Controls" www.leviton.com (3 pages) (date unknown; printed from the internet Jan. 13, 2017).

\* cited by examiner

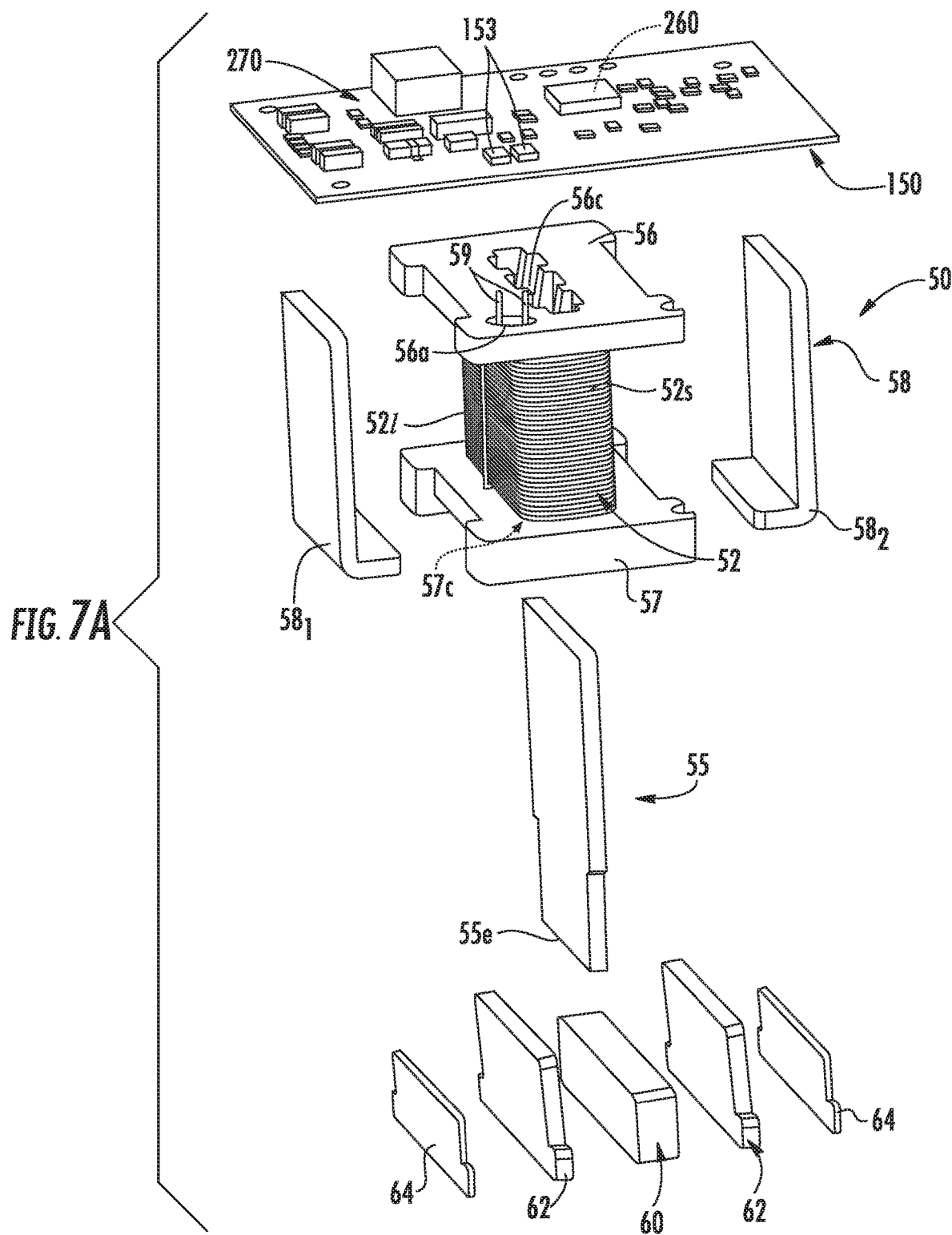

CONTROL CIRCUITS FOR SELF-POWERED SWITCHES AND RELATED METHODS OF OPERATION

FIELD

The present invention relates to electrical switches.

BACKGROUND

Conventional switches that control a variety of electrical devices may require hard-wired connections to a power source, including associated external wiring, power cords, etc., connected between the switch and a load. For example, a wall-mounted switch may be electrically connected to a light source via an electrical wire for controlling the light source in an on-and-off manner. The wiring configuration is typically pre-designed in a floor plan of the building to illustrate the exact location of the controlling switch to run the electrical wire from the illuminator to the controlling switch. In addition, a switch box, PVC wire sleeve, and electric wires may be embedded into the wall, which may require damage to the wall in order to re-locate the switch.

Wireless switches, which may transmit a wireless signal to control electrical devices, may address some of the above issues. However, wireless electronic switches typically require an internal battery having a limited lifetime. As such, the battery must be replaced after a period of time, which may be inconvenient for user.

SUMMARY

Some embodiments of the present invention are directed to micro-control circuits for self-powered switches that can be used to wirelessly control electrical devices without requiring battery power or a wired connection to an external power source.

According to some embodiments, a self-powered switch includes a switch housing comprising an externally accessible user input member, a coil assembly, and a permanent magnet arranged therein such that at least one of the coil assembly and the permanent magnet move relative to each other responsive to movement of the user input member between first and second switch positions, and a control circuit held in the switch housing and coupled to first and second terminals of the coil assembly. The control circuit is configured to detect respective electrical characteristics of the first and second terminals of the coil assembly responsive to the movement of the user input member, and selectively transmit first and second wireless control signals to a remote receiver based on the respective electrical characteristics of the first and second terminals of the coil assembly, respectively.

In some embodiments, the respective electrical characteristics may include first and second voltage states of the first and second terminals of the coil assembly responsive to the movement of the user input member to the first and second switch positions, respectively. The control circuit may be configured to transmit the first wireless control signal in response to detection of the first voltage state at the first terminal, and transmit the second wireless control signal in response to detection of the second voltage state at the second terminal.

In some embodiments, the control circuit may include a transmitter circuit configured for wireless communication with the remote receiver, a phase detection circuit coupled to the first and second terminals of the coil assembly and configured to generate first and second output signals responsive to the movement of the user input member to the first and second switch positions, respectively, and a processor coupled to the phase detection circuit and the transmitter circuit. The processor may be configured to detect the respective electrical characteristics of the first and second terminals of the coil assembly based on the first and second output signals from the phase detection circuit, respectively. The processor may be configured to operate the transmitter circuit to transmit the first wireless control signal to the remote receiver for connecting a load thereof to a power source responsive to the first output signal, and to transmit the second wireless control signal to the remote receiver for disconnecting the load from the power source responsive to the second output signal.

In some embodiments, the phase detection circuit may include a first circuit including a first capacitor coupled to the first terminal of the coil assembly and configured to generate the first output signal based on a first voltage state of the first capacitor responsive to the movement of the user input member to the first switch position, and a second circuit including a second capacitor coupled to the second terminal of the coil assembly and configured to generate the second output signal based on a second voltage state of the second capacitor responsive to the movement of the user input member to the second switch position.

In some embodiments, the control circuit may further include an energy harvesting circuit coupled to the first and second terminals of the coil assembly. The energy harvesting circuit may include at least one capacitor that is configured to store a voltage sufficient to operate the transmitter circuit for wireless communication with the remote receiver responsive to the movement of the user input member to each of the first and second switch positions.

In some embodiments, the coil assembly may include a wire coil wound about a shaft that extends beyond the wire coil and towards the permanent magnet, where the first and second terminals may define opposite ends of the wire coil.

In some embodiments, the permanent magnet may be held between spaced apart first and second plates in the switch housing that extend beyond the permanent magnet and toward the coil assembly to define a cavity between inner surfaces thereof. An end of the shaft may extend into the cavity and may pivot to contact the inner surfaces of the first and second plates in response to movement of the user input member to the first and second switch positions, respectively.

In some embodiments, the switch may include at least one circuit board including the control circuit thereon in the switch housing, and a top member and a bottom member in the switch housing with the coil assembly held therebetween. The top member may include at least one coil terminal aperture through which the first and second terminals of the coil assembly may extend to contact input terminals of the circuit board.

In some embodiments, the switch may include a remote receiver housing that is distinct from the switch housing. The remote receiver housing may include at least one relay therein that is configured to be connected to a power source, and a receiving circuit held in the remote receiver housing and coupled to the at least one relay. The receiving circuit may be configured to receive the first and second wireless control signals from the control circuit and operate the at least one relay to connect and disconnect a load thereof to and from the power source responsive to the first and second wireless control signals, respectively.

According to some embodiments, a control circuit is provided for a self-powered switch that includes a coil assembly and a magnet configured to move relative to each other responsive to movement of a user input member. The control circuit includes a transmitter circuit configured for wireless communication with a remote receiver, a phase detection circuit coupled to first and second terminals of the coil assembly and configured to generate first and second output signals responsive to movement of the user input member to first and second switch positions, respectively, and a processor coupled to the phase detection circuit and the transmitter circuit. The processor is configured to detect respective electrical characteristics of the first and second terminals of the coil assembly based on the first and second output signals from the phase detection circuit, respectively, and operate the transmitter circuit to selectively transmit first and second wireless control signals to the remote receiver based on the respective electrical characteristics of the first and second terminals of the coil assembly, respectively.

In some embodiments, the respective electrical characteristics may be first and second voltage states of the first and second terminals of the coil assembly, where the first and second voltage states are responsive to the movement of the user input member to the first and second switch positions, respectively. The processor may be configured to operate the transmitter circuit to transmit the first wireless control signal to the remote receiver for connecting a load thereof to a power source in response to detection of the first voltage state at the first terminal, and transmit the second wireless control signal to the remote receiver for disconnecting the load from the power source in response to detection of the second voltage state at the second terminal.

In some embodiments, the phase detection circuit may include a first circuit including a first capacitor coupled to the first terminal of the coil assembly and configured to generate the first output signal based on a first voltage state of the first capacitor responsive to the movement of the user input member to the first switch position, and a second circuit including a second capacitor coupled to the second terminal of the coil assembly and configured to generate the second output signal based on a second voltage state of the second capacitor responsive to the movement of the user input member to the second switch position.

In some embodiments, the control circuit may further include an energy harvesting circuit coupled to the first and second terminals of the coil assembly. The energy harvesting circuit may include at least one capacitor that is configured to store a voltage sufficient to operate the transmitter circuit for wireless communication with the remote receiver responsive to the movement of the user input member to each of the first and second switch positions.

In some embodiments, the control circuit may further include a circuit board including the transmitter circuit, the phase detection circuit, and/or the processor thereon. The circuit board may include first and second input terminals attached to the first and second terminals of the coil assembly. The first and second terminals may define opposite ends of a wire coil of the coil assembly.

According to some embodiments, a method is provided for operating a control circuit for a self-powered switch that includes a coil assembly and a magnet configured to move relative to each other responsive to movement of a user input member. The method includes detecting, by a processor, respective electrical characteristics of first and second terminals of the coil assembly responsive to the movement of the user input member, and selectively transmitting, via a transmitter circuit coupled to the processor, first and second wireless control signals to a remote receiver based on the respective electrical characteristics of the first and second terminals of the coil assembly, respectively.

In some embodiments, the respective electrical characteristics may be first and second voltage states of the first and second terminals of the coil assembly responsive to the movement of the user input member to first and second switch positions, respectively. Selectively transmitting the first and second wireless control signals may include transmitting, via the transmitter circuit coupled to the processor, the first wireless control signal in response to detection of the first voltage state at the first terminal, and transmitting, via the transmitter circuit coupled to the processor, the second wireless control signal in response to detection of the second voltage state at the second terminal.

In some embodiments, detecting the respective electrical characteristics of the first and second terminals of the coil assembly may include receiving, from a phase detection circuit coupled to the processor, first and second output signals responsive to the movement of the user input member to the first and second switch positions, respectively, and detecting, by the processor, the respective electrical characteristics of the first and second terminals of the coil assembly based on the first and second output signals from the phase detection circuit, respectively. Selectively transmitting the first and second wireless control signals may include transmitting, via the transmitter circuit coupled to the processor, the first wireless control signal to the remote receiver for connecting a load thereof to a power source responsive to the first output signal, and transmitting, via the transmitter circuit coupled to the processor, the second wireless control signal to the remote receiver for disconnecting the load from the power source responsive to the second output signal.

In some embodiments, the method may further include generating, by the phase detection circuit, the first output signal based on a first voltage state of a first capacitor that is coupled to the first terminal of the coil assembly responsive to the movement of the user input member to the first switch position, and generating, by the phase detection circuit, the second output signal based on a second voltage state of the second capacitor coupled to the second terminal of the coil assembly responsive to the movement of the user input member to the second switch position.

In some embodiments, the method may further include storing, in at least one capacitor of an energy harvesting circuit coupled to the first and second terminals of the coil assembly, a voltage sufficient to operate the transmitter circuit for wireless communication with the remote receiver responsive to the movement of the user input member to each of the first and second switch positions.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 7A is a side partially exploded view of internal components of the switch shown in FIG. 1 according to embodiments of the present invention.

FIG. 10 is a schematic illustration of a control circuit of a self-powered switch according to embodiments of the present invention.

FIG. 11 is a schematic illustration of a receiving circuit of the remote receiver according to embodiments of the present invention.

FIG. 12 is an example of an energy harvesting unit for the control circuit of FIG. 10.

FIG. 13 is an example of a DC power unit for the control circuit of FIG. 10.

FIG. 14 is an example of a phase detection unit for the control circuit of FIG. 10.

FIG. 15 is an example AC-DC power unit of the receiving circuit of FIG. 11.

FIG. 16 is an example of a relay control unit of the receiving circuit of FIG. 11.

DETAILED DESCRIPTION OF EMBODIMENTS

Figure 1:
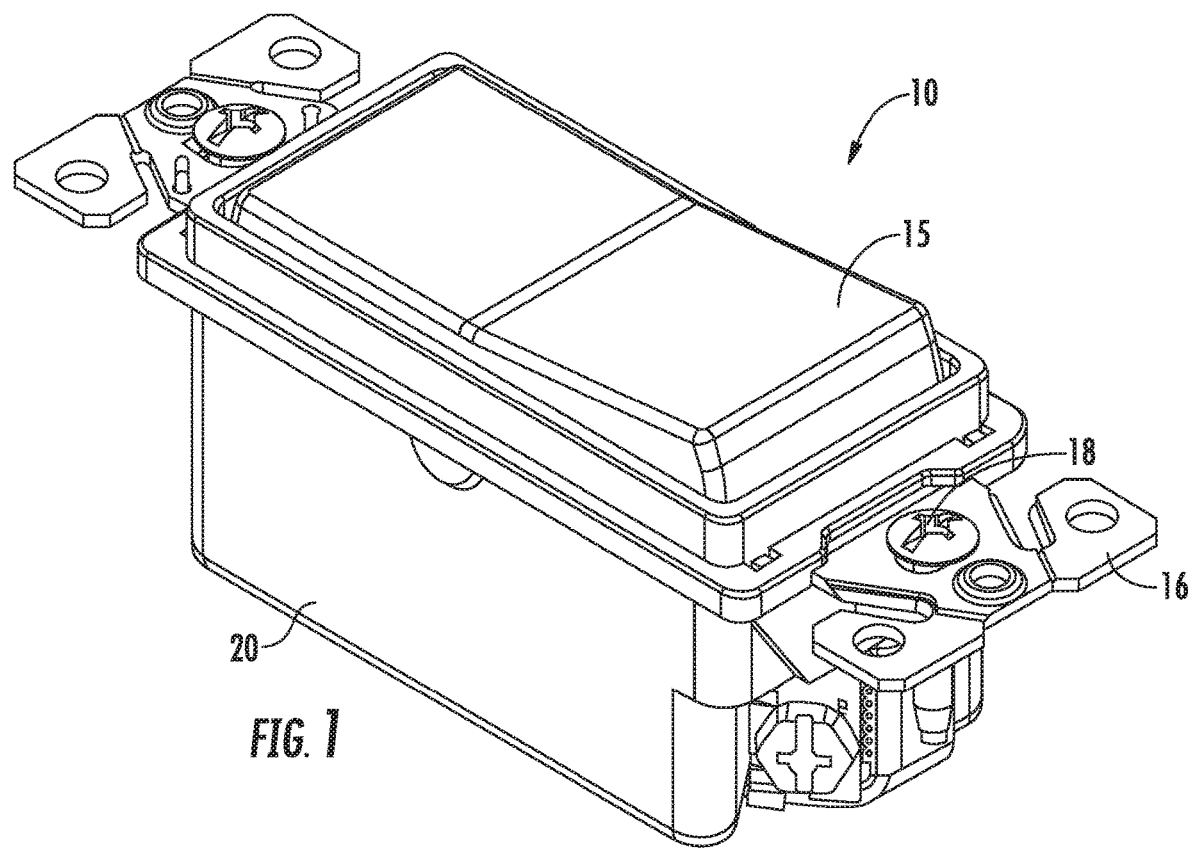
FIG. 1 is a front, side perspective view of an exemplary self-powered switch assembly according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'"). Abbreviated versions of the word "Figure" such as "FIG." and "Fig." are used interchangeably in the application. Broken line boxes in the figures indicate optional features.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Elements "connected" or "coupled" to one another may refer to physical and/or electrical connections or couplings between the elements. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
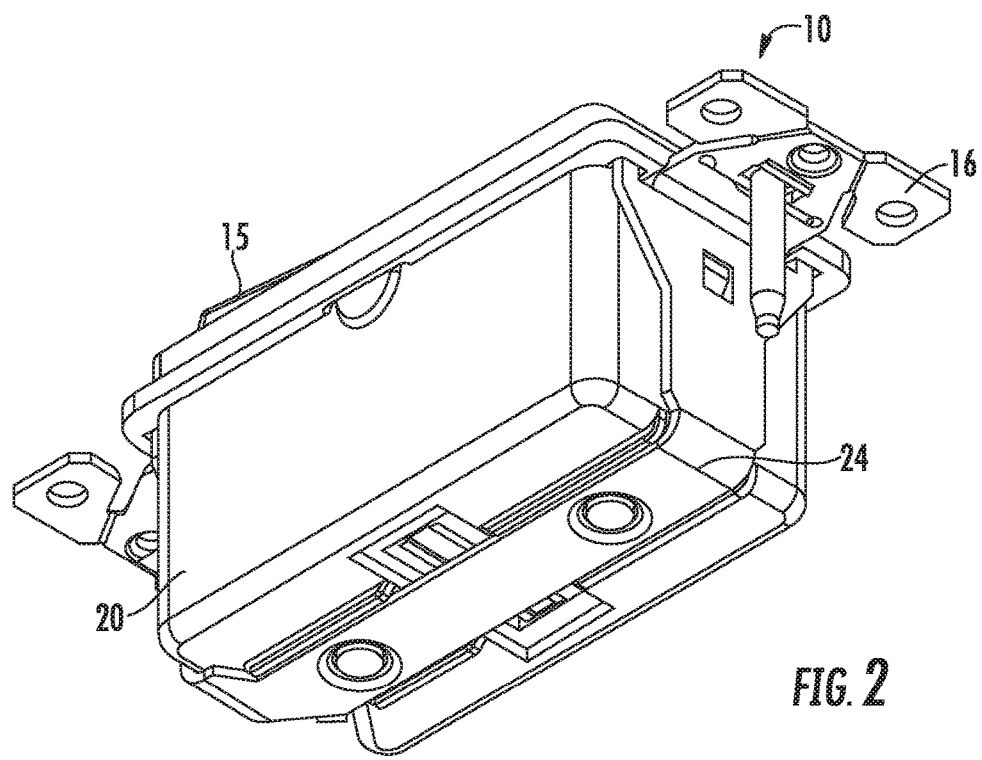
FIG. 2 is side, bottom perspective view of the switch shown in FIG. 1.
Figure 3A:
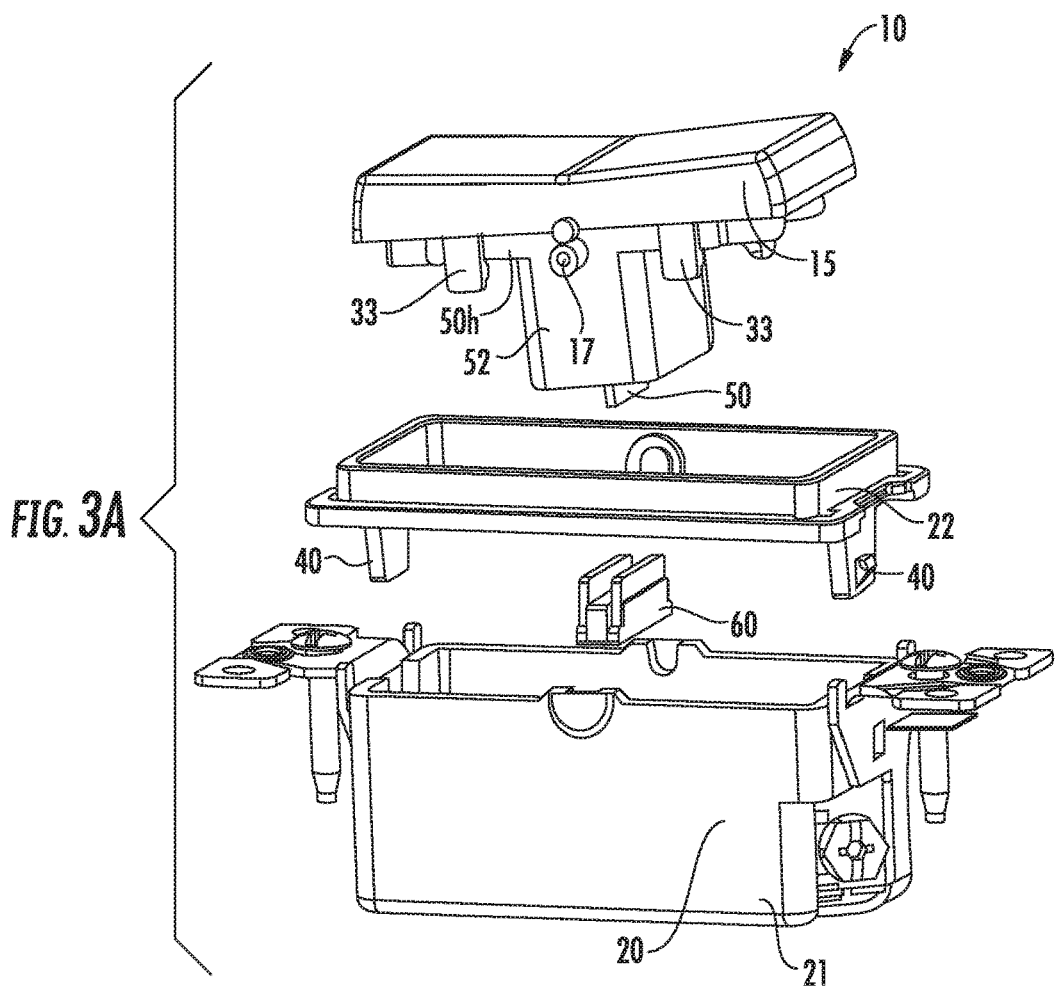
FIG. 3A is a side perspective partially exploded view of the exemplary switch shown in FIG. 1.
Figure 3B:
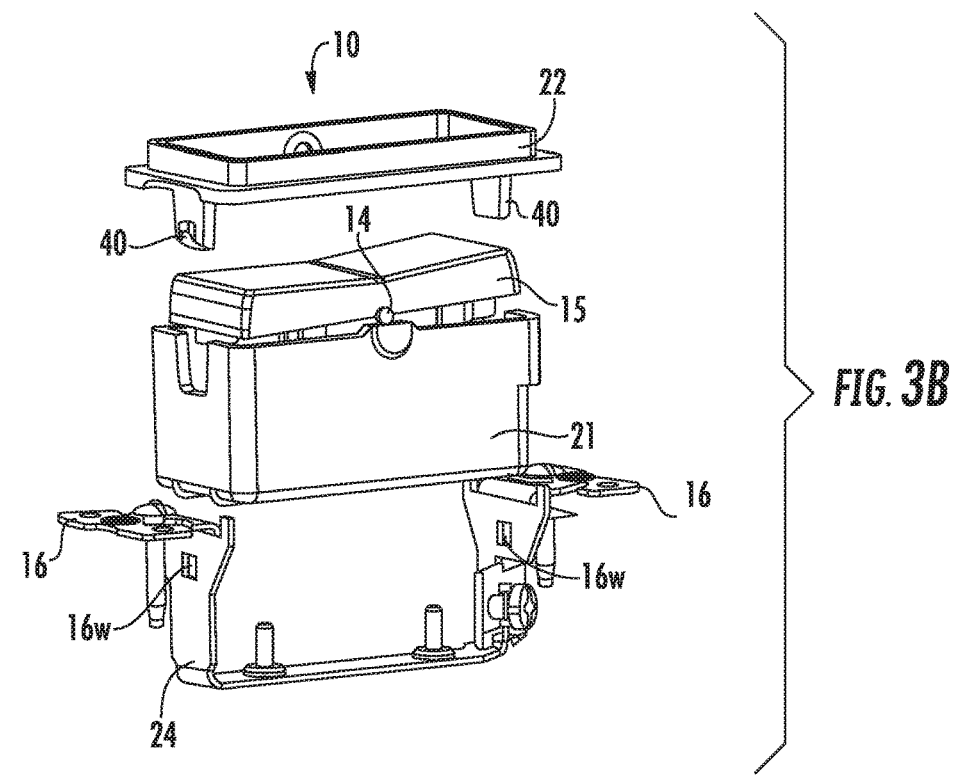
FIG. 3B is another side perspective partially exploded view of the exemplary switch shown in FIG. 1.

Turning now to the figures, FIG. 1 and FIG. 2 illustrate an exemplary self-powered switch 10. The switch 10 can be a switch that controls electrical devices such as ON and OFF controls for appliances, televisions, lights, garage door openers and the like. The switch 10 can wirelessly control the electrical device, typically a remote electrical device.

Figure 4A:
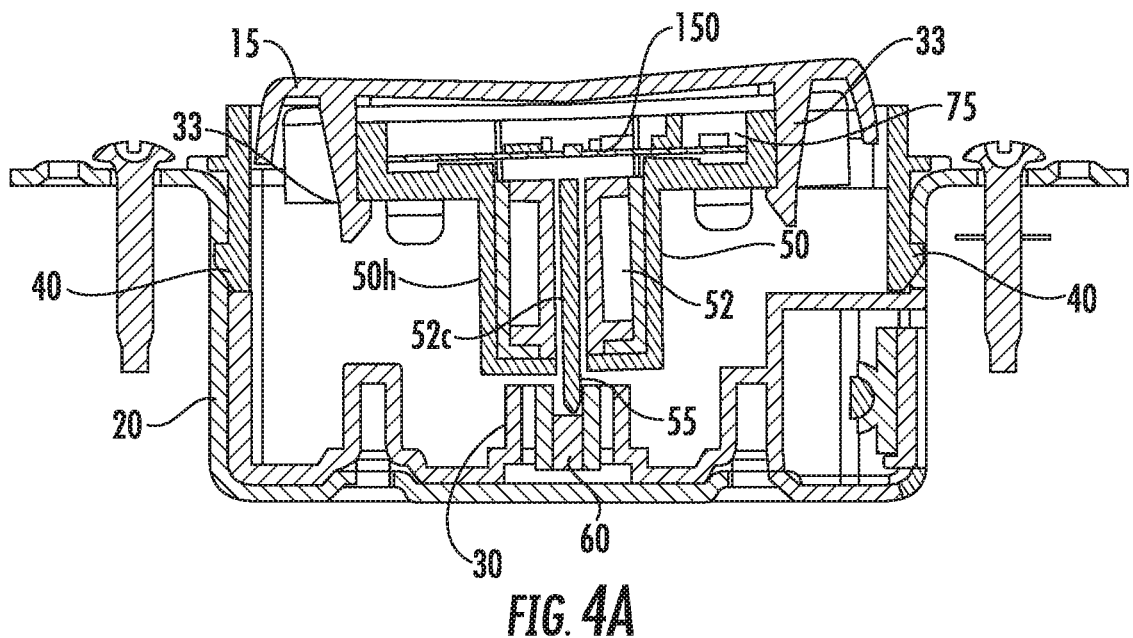
FIG. 4A is a side, section assembled view of the device shown in FIG. 1 according to embodiments of the present invention.
Figure 4B:
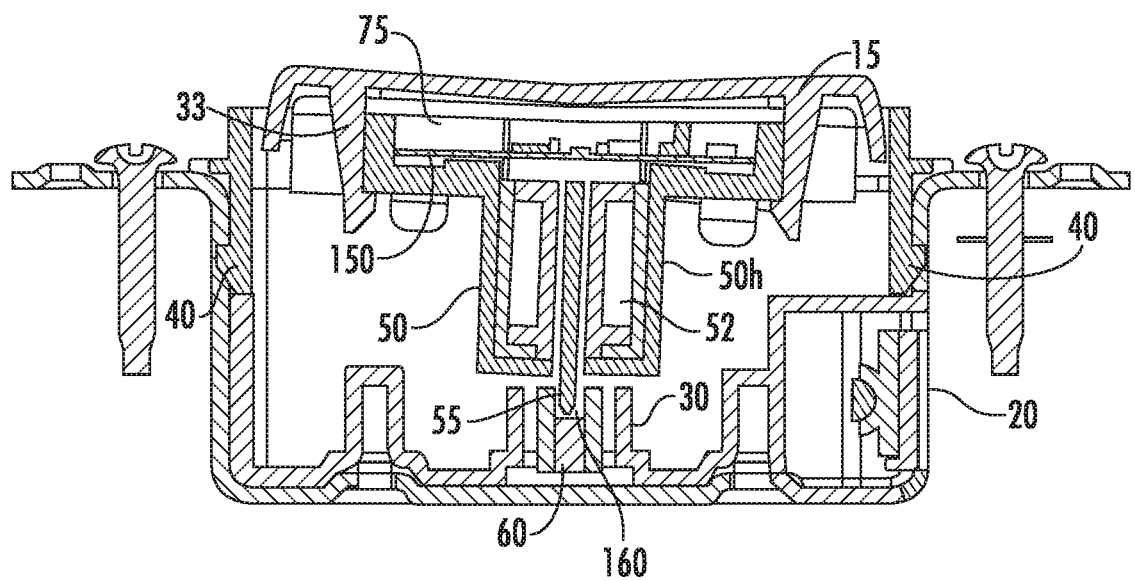
FIG. 4B is a side, section assembled view of the device shown in FIG. 1 with the shaft pivoted to alter magnetic field lines according to embodiments of the present invention.

The switch 10 can have an externally accessible user input member 15, shown as a paddle push button (also known as a "toggle") with first and second end portions that rock between different, i.e., on and off, positions (shown by the arrow in FIG. 4A, for example).

Figure 8A:
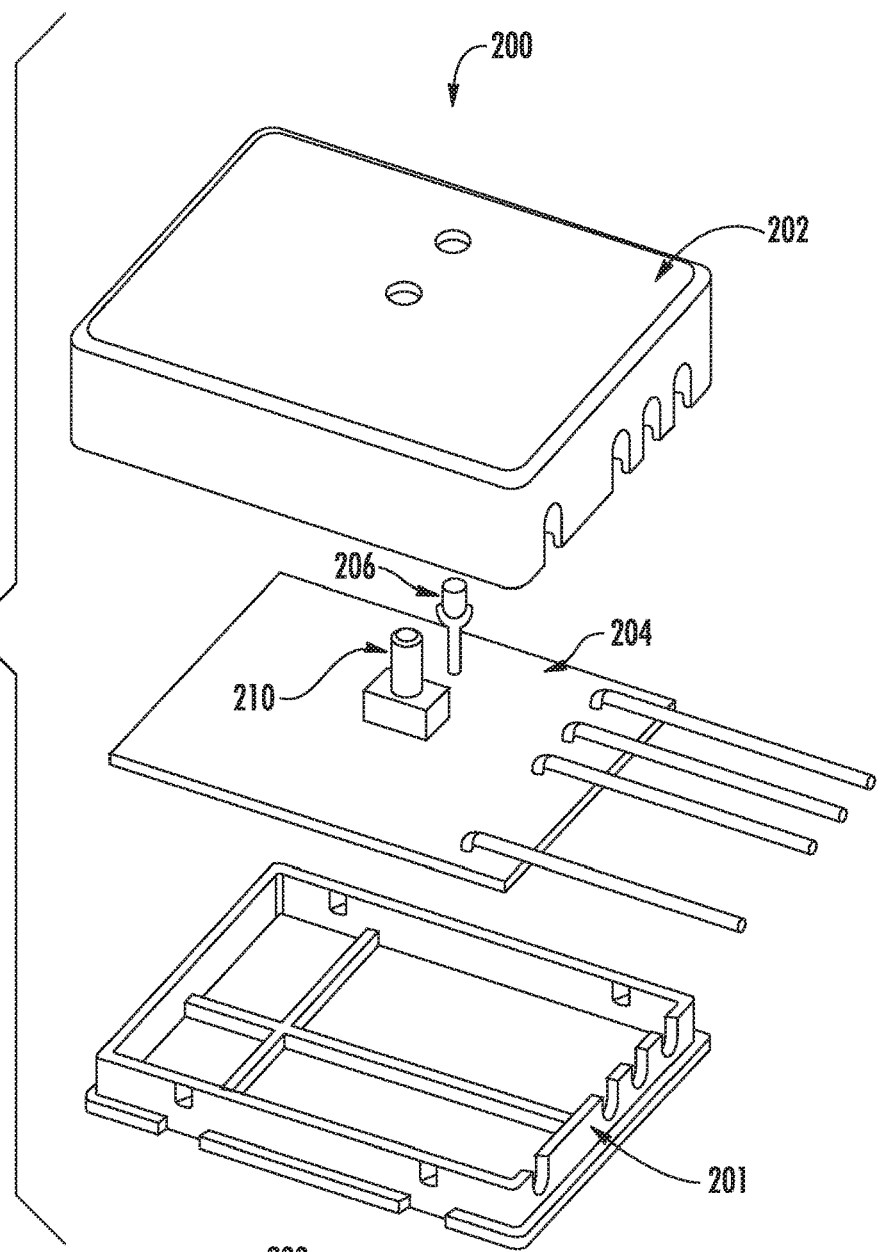
FIG. 8A is a side perspective exploded view of a receiver that wirelessly communicates with the self-powered switch according to embodiments of the present invention.
Figure 8B:
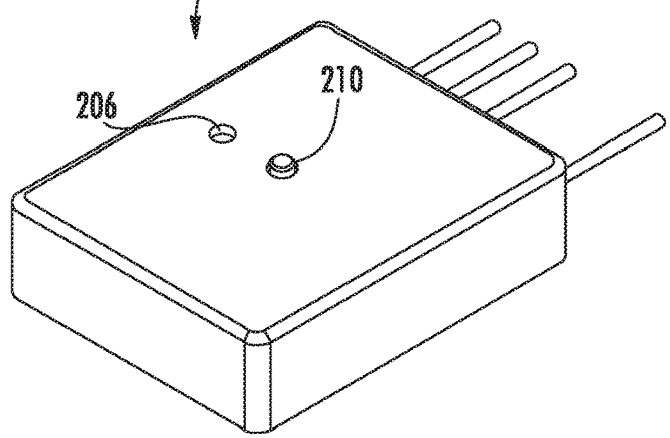
FIG. 8B is a side perspective assembled view of the receiver shown in FIG. 8A according to embodiments of the present invention.
Figure 9:
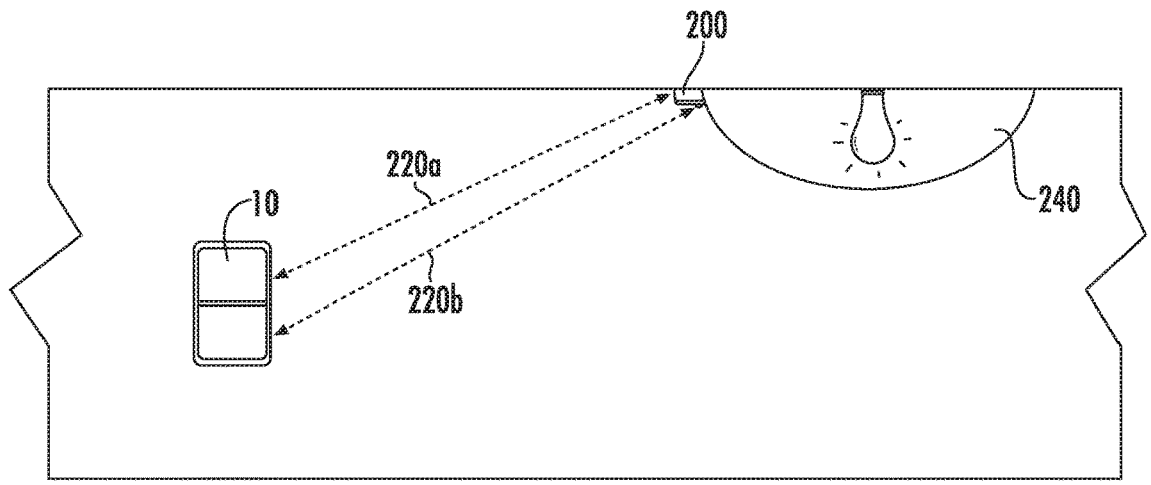
FIG. 9 is a schematic illustration of an in-wall mounted self-powered light switch and a light with a receiver according to embodiments of the present invention.

The switch 10 can be configured, for example, as an in-floor device, in-wall device, surface-mount device, or a device integrated into another device or even as an OFF/ON control for an appliance. As shown in FIGS. 1 and 2, the switch 10 has a housing 20, and at least one mounting bracket 16, shown as two mounting brackets, one extending off each end portion, that can engage one or more fixation members 18 such as screws to mount to a target structure, and an optional strap 24 which may be metal and/or a ground strap. The embodiment shown in FIG. 1 and FIG. 2 may be particularly suitable as an in-wall, optionally flush-mount surface switch that can wirelessly control a remote electrical appliance or device, such as a light 240 via a remote receiver 200 (FIGS. 8A, 8B and 9).

Referring to FIGS. 3A, 3B, 4A and 4B, the housing 20 can include a bottom housing 21 and a cooperating mid-housing 22 that are attached together. The mid-housing 22 can reside between the user input member 15 and the bottom housing 21. The switch 10 also includes an electromagnetic coil assembly 50 with an internal housing 50$h$ residing under the user input member 15 and holding a wire coil (also referred to herein as a coil) 52 and a core or shaft 55 extending through the wire coil 52. The wire coil 52 is wound about the shaft 55 (either directly wound around the shaft, or, more typically, wound about a separate member, as shown in FIG. 7A). The end portion of the shaft 55$e$ can extend into a cavity 160 to face a permanent magnet 60 held in the bottom housing 21. The permanent magnet 60 can be held in a cradle 30 in the bottom housing 21. The user input member 15 can include inwardly extending brackets 33 that attach to the housing 50$h$. The brackets 33 can comprise a plurality of longitudinally spaced apart brackets 33 that extend from each long side of the user input member 15. The brackets 33 can frictionally engage the housing 50$h$.

Referring to FIGS. 3A, 3B, 4A, 4B and 5A, the mid-housing 22 can include inwardly extending brackets 40 that attach to the bottom housing 21. The brackets 40 can extend from ends (short sides) of the mid-housing 22. The brackets 40 can include outwardly extending protrusions 40$p$ that can engage a window 16$w$ in the strap 23 of the mounting bracket 16. The mounting bracket 16 can be metal. The housing 20 may be polymeric or metal.

The shaft 55 can be a ferromagnetic (i.e., steel) shaft of any suitable shape. As shown in FIG. 7A, the shaft 55 is a planar plate which can have a polygonal shape, typically having a pair of long sides and a pair of short sides with one of the short sides providing the end 55$e$ that faces the permanent magnet 60.

Still referring to FIG. 7A, the coil 52 can include a pair of long sides 52$l$ joined by a pair of short sides 52$s$ and can have a number of adjacent, stacked coil turns N, where N is typically between 10 and 10,000. The coil 52 can have an open center channel 52$c$ (FIG. 5E) surrounded by the long and short sides 52$l$, 52$s$ that the shaft 55 extends through. In particular embodiments, the long sides have a length that is between 2x-4x greater than the length of the short sides.

The permanent magnet 60 can comprise a rare earth magnet, such as, for example, a neodymium magnet (also known as a NdFeB magnet), made from an allow of neodymium, iron and boron. Particular examples of rare earth magnets that may be suitable for the permanent magnet 60 include $Nd_2Fe_{14}B$, $SmCo_5$ and $Sm(Co,Fe,Cu,Zr)_7$. As shown in FIG. 7A, the permanent magnet 60 can have a rectangular shape with a long side facing the shaft end 55$e$ and extending laterally across the housing 20.

As shown in FIGS. 3B, 4A, 4B, and 5A-5E, for example, the housing 50$h$ can be attached to the user input member 15. The housing 50$h$ can include a laterally outwardly extending spindle 17 that resides in opposing side channels 170 of the housing 20. The spindle 17 can comprise first and second spindle segments (rather than a continuous length member) and can extend outward under opposing long sides of the user input member 15 to pivotably engage the channels 170.

The side channels 170 in the switch housing 20 can be bearing channels for the spindle 17. The side channels 170 can be formed by cooperating pairs of arcuate channels that face each other 170$a$, 170$b$ in the mid housing 22 and the bottom housing 21, respectively.

FIGS. 3B and 5A-5E show that the user input member 15 may include laterally extending shaft segments 14 that reside adjacent the spindle 17 and which can extend laterally outward a shorter distance than the spindle 17. The shaft segments 14 and spindle segments can each reside in a common channel portion of the switch housing, i.e., within pairs of the cooperating channels 170$a$, 170$b$.

Figure 7B:
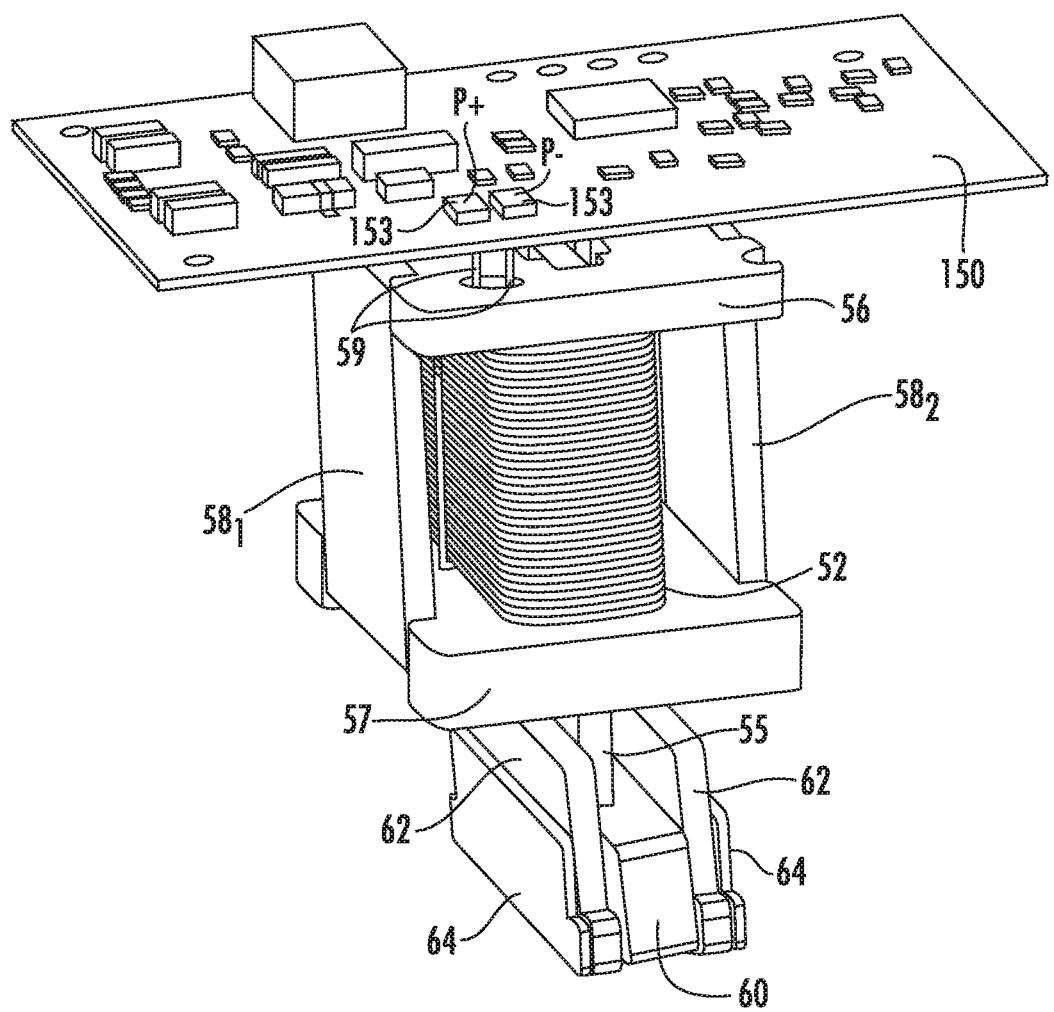
FIG. 7B is a side perspective assembled view of the internal components shown in FIG. 7A.

Referring to FIGS. 4A, 4B, 5B, 5C, 7A, and 7B, the switch 10 can also include at least one circuit board 150, which may comprise a flexible and/or a rigid printed circuit board. The at least one circuit board 150 can include power connections 153 to extensions 59 (defining first and second coil terminals 59) of the coil 52 and can hold a transmitter 260 and a power-generation harvesting circuit 270 (FIG. 7A). The at least one circuit board 150 can reside under the user input member 15, typically in a cavity 75 above the shaft 55 (in the orientation shown in FIGS. 3A, 4A and 4B, for example). The cavity 75 can be provided between a planar portion of the magnet coil housing 50$h$ adjacent and under the user input member 15.

Figure 6A:
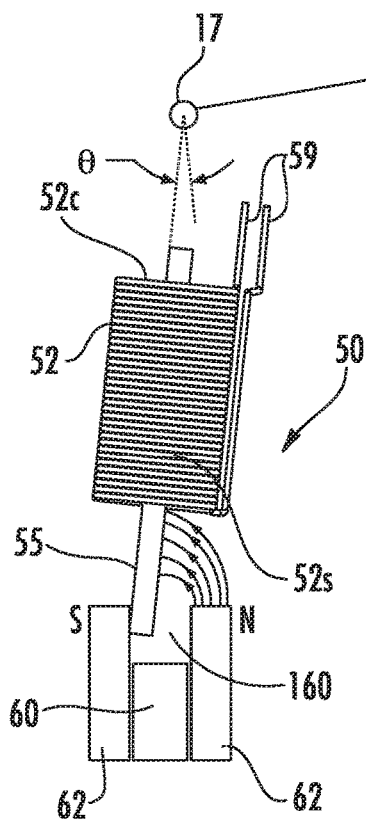
FIGS. 6A and 6B are enlarged schematic illustrations of different positions of the coil and permanent magnet for a self-powered switch according to embodiments of the present invention.
Figure 6B:
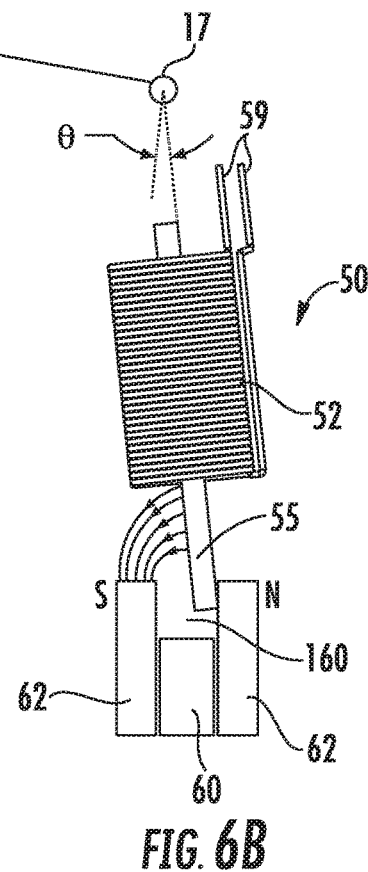

Referring to FIGS. 4A, 4B, 6A, and 6B, the housing 50$h$ can pivot about the spindle 17 as a unit with the user input member 15 to move the end of the shaft 55$e$ side to side in a cavity 160 above the permanent magnet 60. The pivoting action causes the centerline of the shaft to change in angular orientation an angular distance θ that can be between 10-40 degrees, typically 10-30 degrees, to pivot the end of the shaft 55$e$ to contact opposing inner surfaces of plates 62 which extend a short distance above the permanent magnet 60. The plates 62 can be ferromagnetic, i.e., steel, conductive plates 62 and can alter flux lines between the coil 52 and the N, S poles of the permanent magnet 60 as shown in FIG. 6A, 6B.

The magnetic pole orientation can be provided in the reverse from that shown. The plates 62 can have other shapes and are not required to be planar.

FIGS. 7A and 7B illustrate exemplary embodiments of the coil assembly 50 and the permanent magnet 60 with cooperating components such as the plates 62 and thinner, shorter shim plates 64 that can be used to adjust the distance of the N-S poles from the end of the shaft 55e.

The permanent magnet 60 can be rectangular with a pair of long sides joined by a pair of short sides and, as shown in FIG. 7A, the long sides can extend in a lateral dimension of the switch housing across between 50-100% of a lateral extent L of the switch housing 20, more typically between 75-100% of the lateral extent.

Figure 5A:
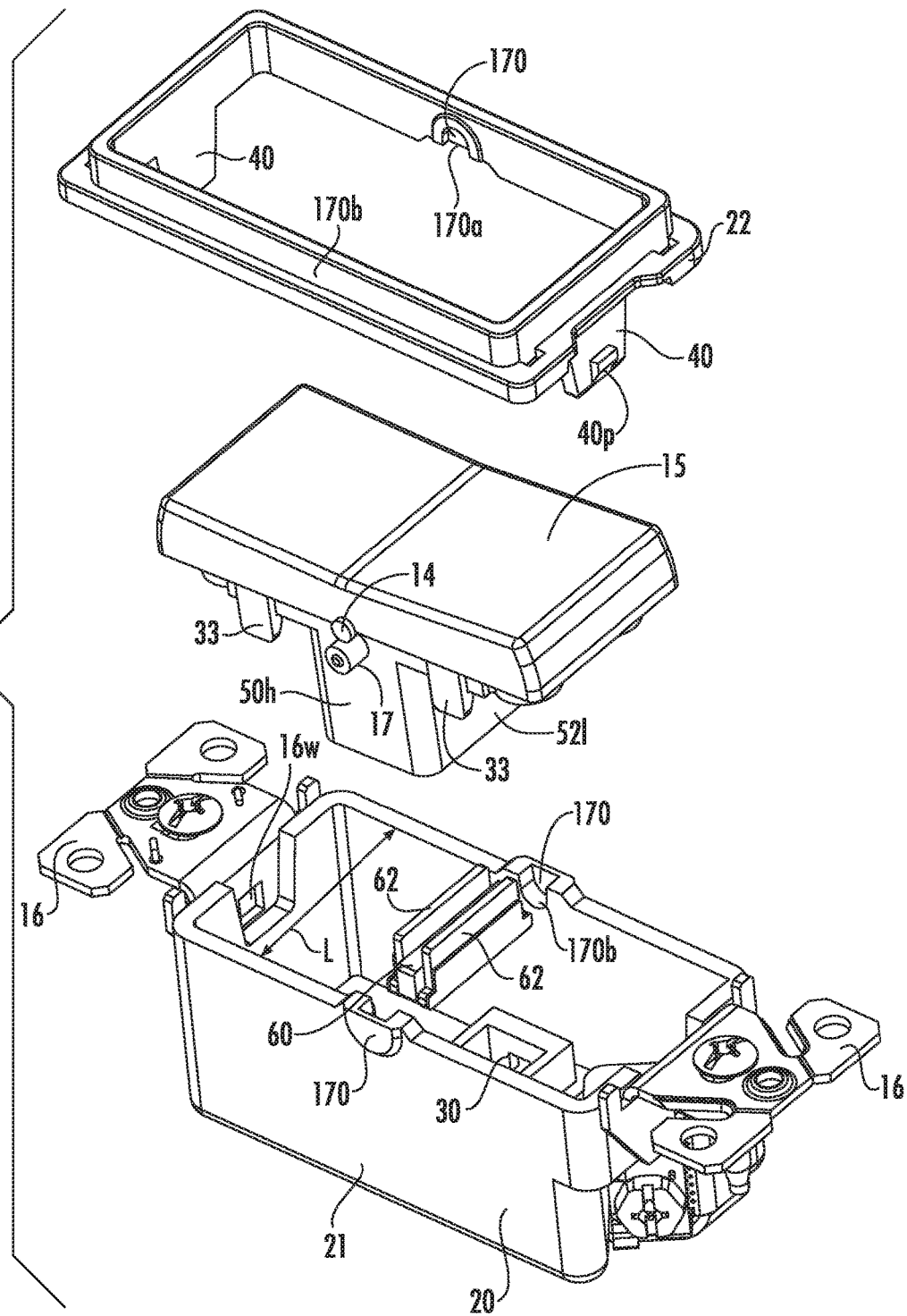
FIG. 5A is a top, partially exploded view of the device shown in FIG. 1.
Figure 5B:
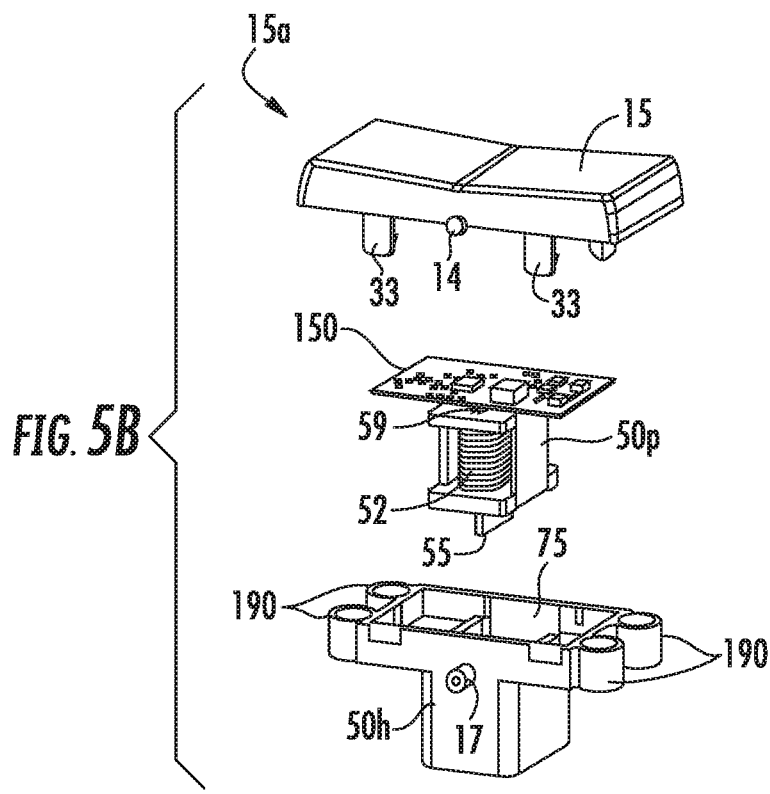
FIG. 5B is a side partially exploded view of a toggle and housing sub-assembly for the switch shown in FIG. 5A according to embodiments of the present invention.

Referring to FIGS. 5B, 7A, and 7B, the at least one circuit board 150 can comprise the power inputs 153 that connect to the terminals/extensions 59 of the coil 52. The coil 52 can be held between longitudinally spaced apart first and second end members 56, 57 that have channels 56c, 57c through which the shaft 55 extends. The first end member 56 can also include at least one aperture 56a that the terminals 59 can be routed through to attach to the power inputs/connections 153 on the at least one circuit board 150. The channel 56c of the first member 56 can frictionally engage the top end portion of the shaft 55t facing the user input member 15. However, other attachment configurations may be used. The coil assembly 50 can also include a magnet yoke 58, shown as comprising first and second yoke members $58_1$, $58_2$ that attach to the first and second end members 56, 57 (FIGS. 7A, 7B). The coil assembly 50 can be held in the housing 50h (FIGS. 4A, 4B, 5A-5E) as discussed above.

The at least one circuit board 150 can comprise a rectangular shape as shown in FIGS. 5B, 7A, and 7B. The user input member 15 can have at least a portion that is visually transmissive, such as transparent or translucent. The entire user input member 15 can be visually transmissive and the at least one circuit board 150 can be visually seen by a user. In some particular embodiments, the at least one circuit board 150 can be a single circuit board.

Figure 5C:
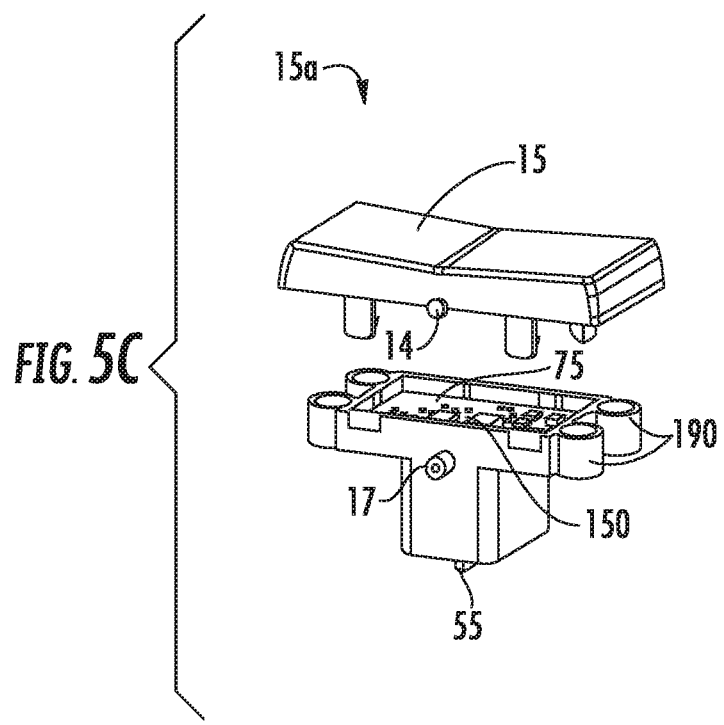
FIG. 5C is a partial assembly view of the sub-assembly shown in FIG. 5B.
Figure 5D:
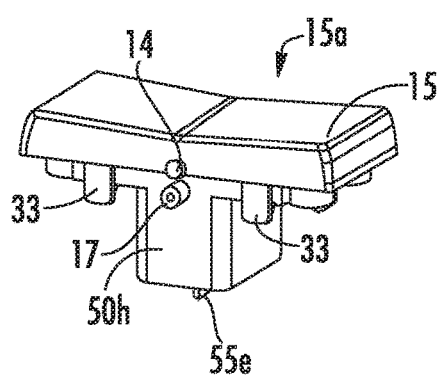
FIG. 5D is a side perspective assembled view of the sub-assembly shown in FIG. 5B.
Figure 5E:
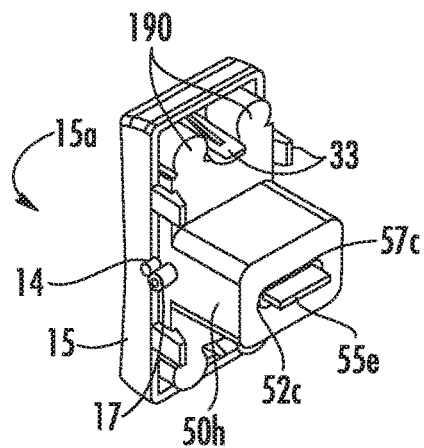
FIG. 5E is a bottom perspective assembled view of the toggle and housing sub-assembly shown in FIG. 5B.

As shown in FIG. 5B-5E, in some embodiments the switch 10 includes a toggle and housing sub-assembly 15a. The terminals 59 of the coil 52 can be attached to the at least one printed circuit board 150. This package 50p (FIG. 5B) can be inserted into the housing 50h with the printed circuit board 150 in the cavity 75 (FIG. 5C). The user input member 15 can then be press-fit attached to the housing 50h (FIG. 5D, 5E) to form the sub-assembly 15a.

The housing 50h can comprise curvilinear ends 190 (which may be shaped as semicircular ears) that engage the attachment members 33 of the user input member 15.

As shown in FIG. 7A, the at least one circuit board 150 can include a transmitter 260 and a power generator harvesting circuit 270.

Figure 17:
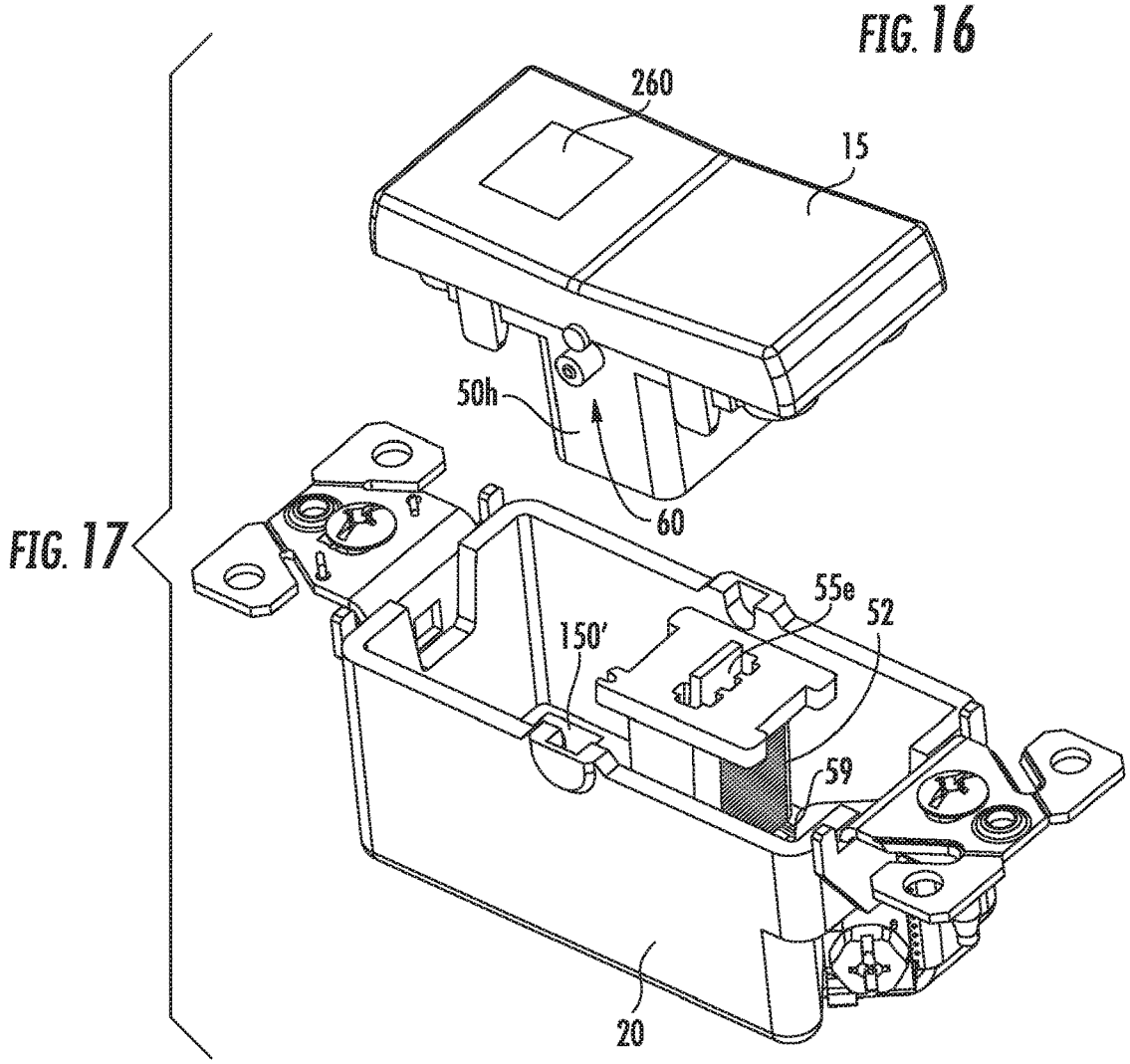
FIG. 17 is a side perspective view of an alternate embodiment of a self-powered switch according to embodiments of the present invention.

As shown in FIG. 17, it is also contemplated that the permanent magnet 60 and plates 62 can be held by the magnet housing 50h and move (based on the spindle attachment to the housing 20) relative to the coil 52 and shaft 55, which can be stationary. The coil 52 can be held in the bottom housing 22 aligned with a medial portion of the user input member 15 under the magnet 60. The at least one printed circuit board 150, can reside under the coil 52 and terminals 59 can extend longitudinally outward or below the coil 52. The transmitter 260 can reside closer to the user input member 15 than the coil 52.

FIGS. 8A and 8B illustrate an exemplary remote receiver 200 that can be wirelessly operated by the switch 10. The receiver 200 can include a base 201, a cover 202, an indicator light 206 and a switch match code member 210. The indicator light 206 can reflect active or inactive status based on the ON or OFF configuration of the switch 10, for example. The switch match code member 210 can be configured to recognize signal from a particular switch or the switch can be coded to work with only corresponding receivers 200 having a match where more than one switch 10, or a different toggle 15, of a single switch 10, may be used for different purposes and/or different lights, for example.

FIG. 9 illustrates one exemplary application of the switch 10 in a commercial or residential building as a switch 10 that wirelessly directs the receiver 200 to turn the light 240 ON and OFF, for example, by transmitting first and second control signals 220a, 220b in response to actuation of the user input member 15 to first and second switch positions, respectively.

Figure 10:
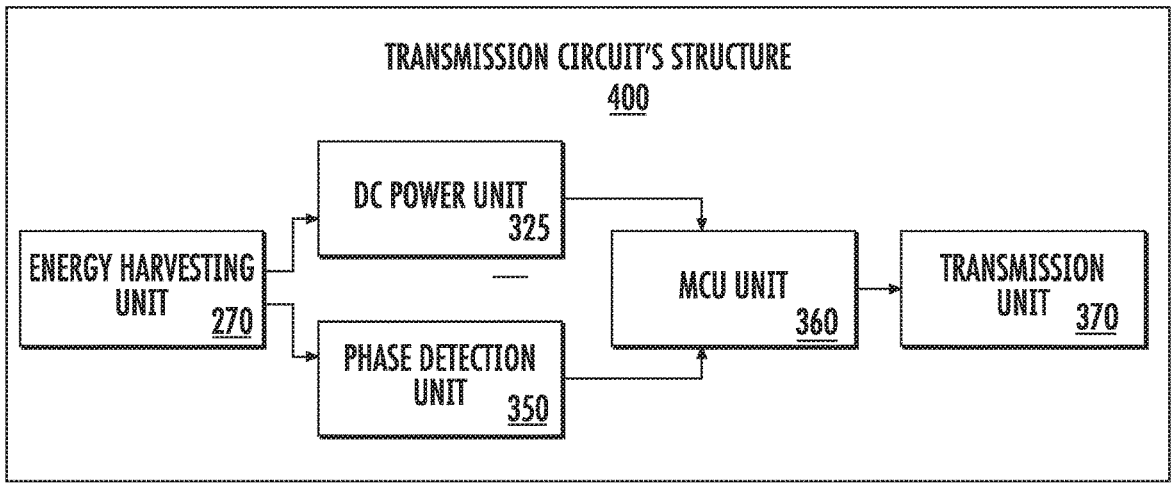
FIGS. 10-16 are circuit diagrams illustrating transmission/control and receiving circuits according to embodiments of the present invention.

FIG. 10 is a schematic illustration of an example control circuit 400 of the self-powered switch 10. The control circuit 400 may be included in the switch housing 20, and is configured to output control signals 220a, 220b (FIG. 9) that operate the remote receiver 200 to connect or disconnect an electrical appliance or other device coupled thereto to or from a power source, such as an AC power source. The control circuit 400 includes an energy harvesting unit 270, a DC power unit 325, a phase detection unit 350, an MCU unit (processor unit) 360, and a transmission unit 370. For clarity, it is noted that the term "unit" when referring to the circuit structures of FIGS. 10-16, for example, is used for ease of discussion to refer to circuits or sub-circuits and may be distributed or held on a single component, i.e., substrate or printed circuit board and which may share components of other units (circuits or sub-circuits).

Figure 11:
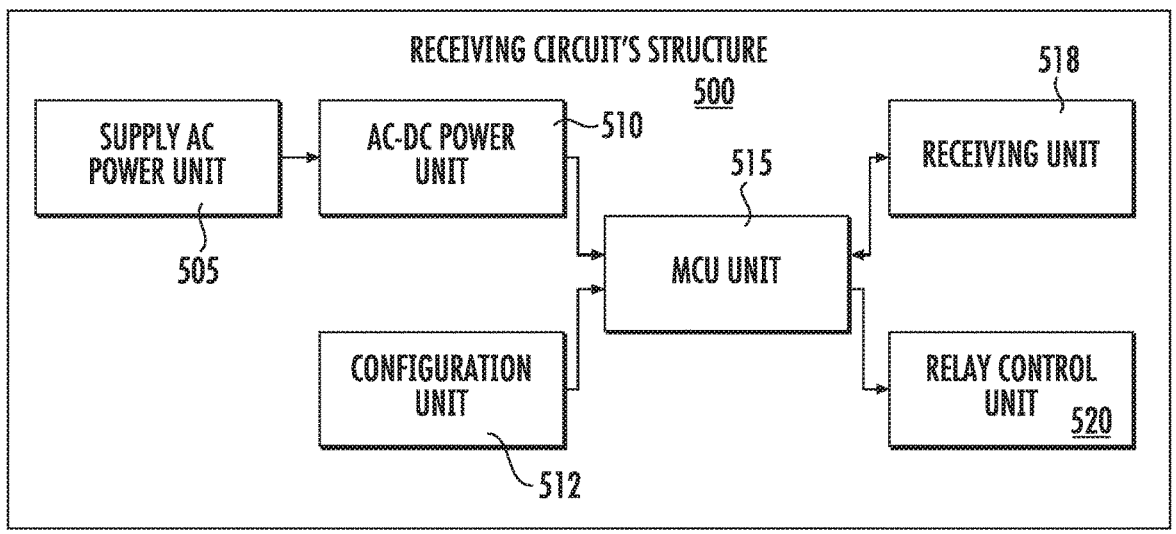

FIG. 11 is a schematic illustration of a receiving circuit 500 of the remote receiver 200. The receiving circuit 500 can include an AC power supply unit 505, an AC-DC power unit 510, a configuration unit 512, an MCU (or processor) unit 515, a receiver unit 518, and a relay control unit 520. The AC-DC power unit 510 converts the input AC power into DC power, the configuration unit 512 controls switching of the receiving circuit 500 into a pairing mode for receiving wireless control signals from the control circuit 400 via the receiving unit 518, and the processor unit 515 analyzes the wireless control signal provided by the receiving unit 518 and controls action of the relay control unit 520 in response to the wireless control signal.

Figure 12:
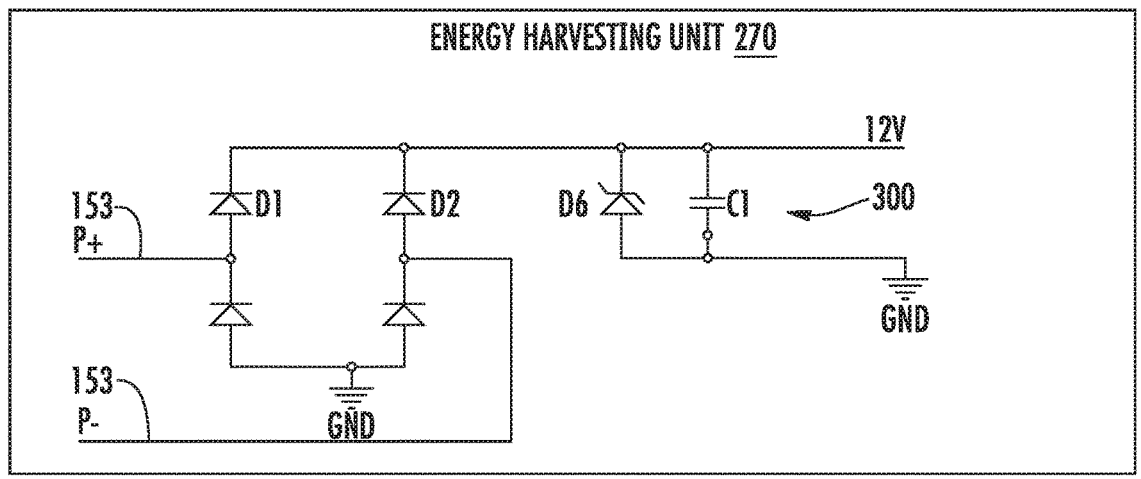

FIG. 12 is an example of an energy harvesting unit 270 for the control circuit 400 (FIG. 10). The energy harvesting unit 270 is configured to gather electromagnetic energy and convert the electromagnetic energy into electrical energy, in particular, electromotive force. In the example of FIG. 12, the energy harvesting unit 270 includes at least one power storage capacitor 300, power inputs 153 (P+ and P− coupled to the first and second terminals of the coil 52, respectively), and a rectifier bridge D1,D2 coupled to the first and second terminals 59 of the coil 52. Alternating current, which is induced by movement of the coil 52 and/or magnet 60 relative to one another due to actuation of the user input member 15, is provided to one of the inputs 153 via the terminals of the coil 52 (depending on the position of the user input member 15), is rectified by the rectifier bridge D1, D2, and charges the capacitor 300. The voltage across the capacitor 300 can be stabilized at 12V by regulator D6, and is sufficient to operate one or more other components of the control circuit 400. For example, in some embodiments, the movement of the coil 52 and/or magnet 60 relative to one another due to actuation of the user input member 15 may be sufficient to generate a voltage of about 5V DC for about 4 ms, as measured at the capacitor 300.

Figure 13:
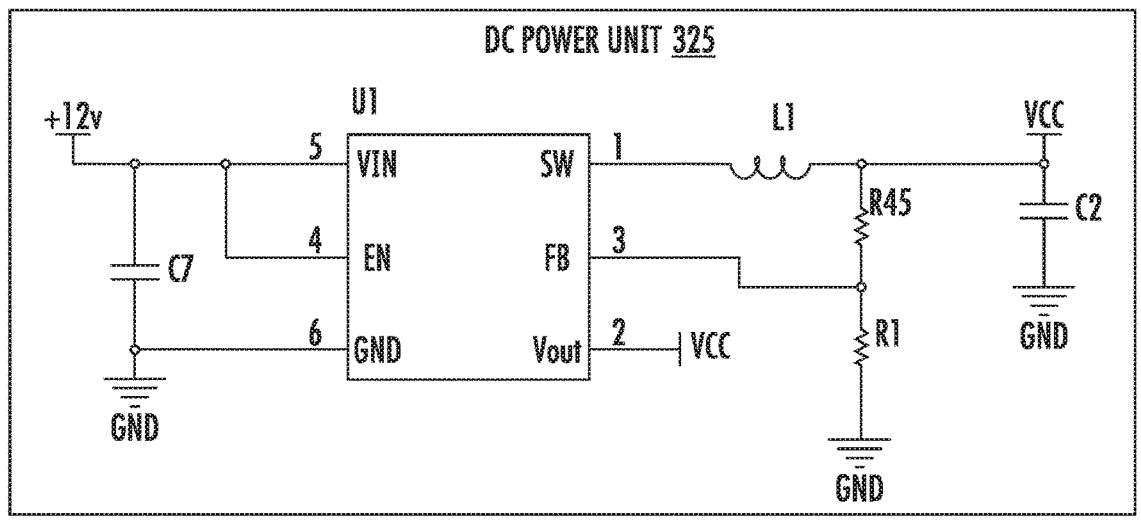

FIG. 13 is an example of a DC power unit 325 for the control circuit 400 (FIG. 10). The DC power unit 325 is used to generate a desired DC voltage from the 12V provided by the energy harvesting unit 270, for example, to operate one or more other components of the control circuit 400. In the example of FIG. 13, the DC power unit 325 generates a +3.3V DC power source, which is suitable for providing operating power for the transmitter unit 370; however, it will be understood that other voltages may be generated based on the design of the control circuit 400.

Figure 14:
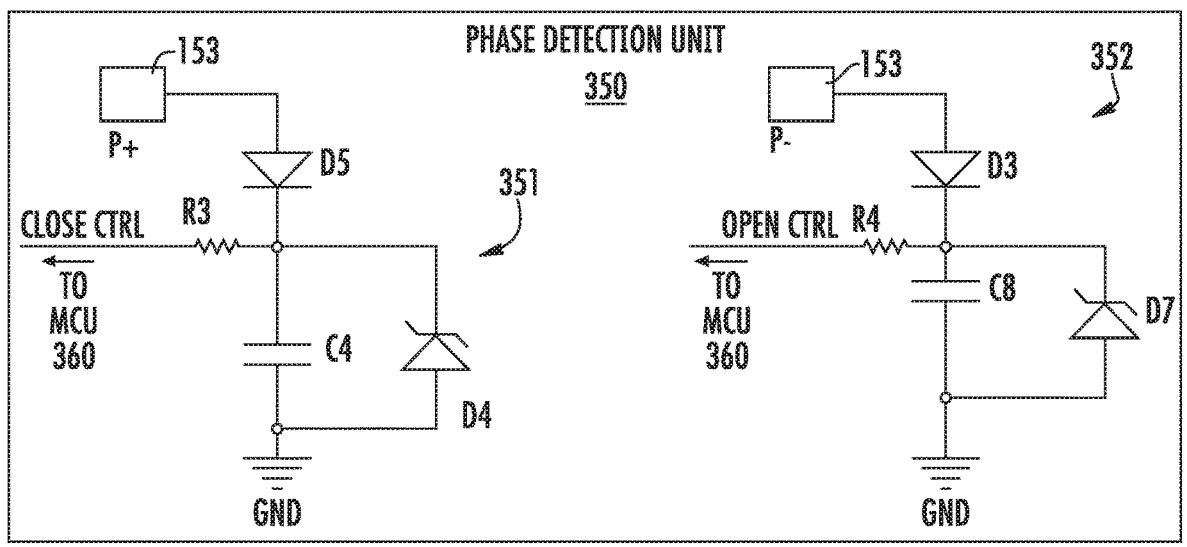

FIG. 14 is an example of a phase detection unit 350 for the control circuit 400 (FIG. 10). The phase detection unit 350 is coupled to the first and second terminals 153 (P+ and P−) of the wire coil 52, and is configured to detect a direction of current or power resulting from actuation of the user input member 15. In the example of FIG. 14, the phase detection unit 350 includes a "close control" circuit 351 and an "open control" circuit 352. The P+ connection 153 of the close control circuit 351 is connected to one of the two terminals 59 of the wire coil 52, while the P− connection 153 of the open control circuit 352 is connected to the other of the two terminals of the wire coil 52. Alternating current, which is induced by movement of the coil 52 and/or magnet 60 relative to one another, is provided to one of the inputs 153 via the terminals of the coil 52 (depending on the position of the user input member 15), and charges the capacitor C4 or C8, which provides an output "Close_ctrl" or "Open_ctrl" (regulated to below 3.3V by regulators D4 or D7) to the processor 360. That is, the current induced by the movement of the coil 52 and/or magnet 60 relative to one another is used not only by the energy harvesting unit 270 to charge the storage capacitor 300, but can be separately used by the phase detection unit 350 to generate outputs that are indicative of the respective voltage states of the terminals 59 of the coil 52 responsive to movement of the user input member 15 to (or from) the first and second switch position, respectively. As described in greater detail below, the outputs of the phase detection unit 350 are used by the processor 360 to selectively control the transmitter unit 370 to transmit a first wireless control signal 220a (FIG. 9) to the remote receiver 200 to connect a load 240 thereof to the power source in response to detection of one of the voltage states, and to transmit a second wireless control signal 220b (FIG. 9) to the remote receiver 200 to disconnect the load 240 from the power source in response to detection of the other of the voltage states. More generally, respective electrical characteristics of the terminals 59 of the coil 52 (resulting from movement of the user input member 15 to the first and second switch positions) are used to control transmission of the wireless control signals 220a, 220b to the remote receiver 200.

Figure 15:
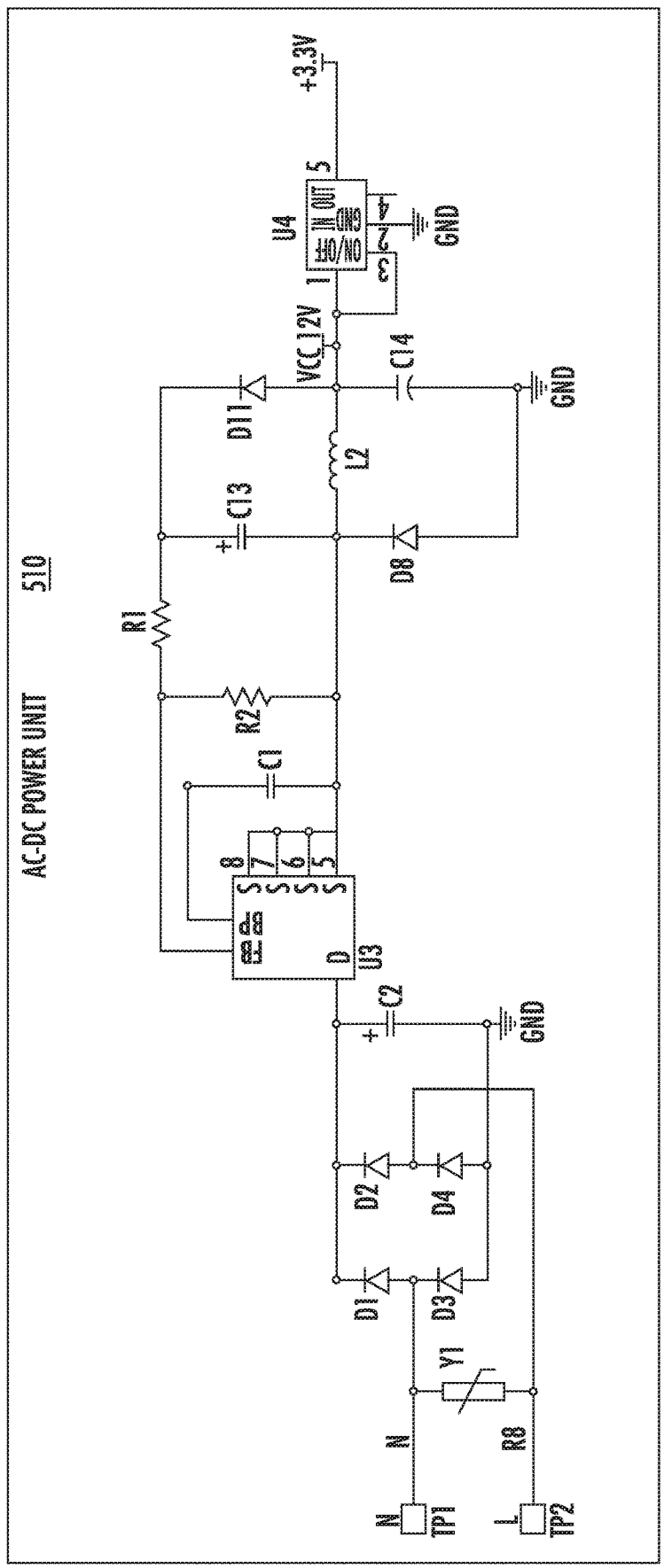

FIG. 15 is an example AC-DC power unit 510 of the receiving circuit 500 (FIG. 11). The AC-DC power unit 510 converts the AC power from the AC power supply unit 505 into DC power for operating one or more other components of the control circuit 400. In the example of FIG. 15, the AC-DC power unit 510 generates a 12V DC source to power the relay control unit (FIG. 16), as well as a 3.3V DC power source to power the receiver unit 518. However, it will be understood that other voltages may be generated based on the design of the receiving circuit 500.

Figure 16:
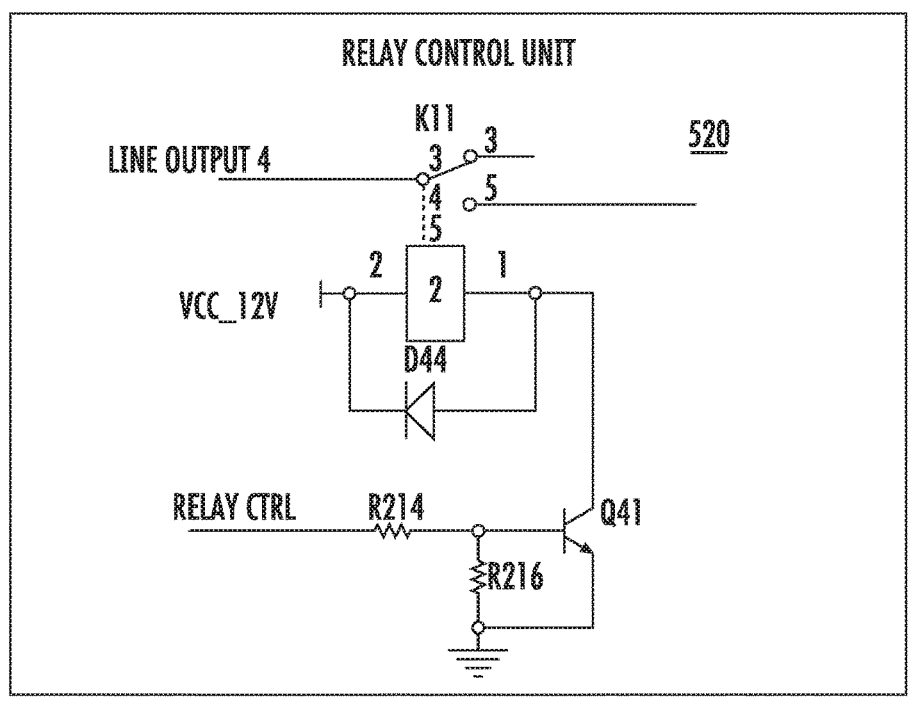

FIG. 16 is an example of a relay control unit 520 of the receiving circuit 500 (FIG. 11). The relay control unit 520 is configured to control operation of a relay to connect or disconnect a load (e.g., an electronic appliance or other device coupled to the remote receiver 200) to or from an AC power source. In particular, as noted above with reference to FIG. 11, in response to receiving a wireless control signal from the control circuit 400, the processor unit 515 provides an output "Relay_ctrl" to the relay control unit 520, which controls operation of the relay K11 via triode Q41 to either close the relay K11 to provide a connection between "line_output" and "line_input" (thereby connecting the load to AC power), or to open the relay K11 to open the connection between line_output" and "line_input" (thereby disconnecting the load from AC power).

The self-powered switch 10 can provide power based on the movement of the user input member 15, which, in turn, moves one or both of the coil 52 and the permanent magnet 60 relative to one another. By way of example only, the self-generated power can be based on electromotive forces generated by operation (in response to) movement of the user input member 15 (to move one or both of the permanent magnet 60 and/or coil 52 relative to one another) based on the below theory of operation:

$$u = N * A * (dB/dt) \tag{Equation 1}$$

where u is the induced electromotive force, N is the number of turns of the coil (N can be any suitable number, typically between 10-10,000), A is the sectional area, B is the electromagnetic induction strength, and t is the time.

(1) When movement of the user input member 15 of the self-powered switch 10 stops, movement of the coil 52 relative to the magnet 60 likewise stops, and the coil's dB/dt is 0, so the induced electromotive force u is 0.

(2) When the user input member 15 moves, the coil 52 moves, and the coil's dB/dt changes, so that the induced electromotive force u has a value, this induced electromotive force u can be used to generate power (e.g., by passing through the full wave rectifier D1, D2 of FIG. 12 to generate DC power/energy). At least one storage capacitor in the switch 10 can store this DC energy (e.g., in capacitor 300 of FIG. 12). The storage capacitor's DC voltage can be between 1-10V for between 2 ms-10 ms, typically about 5V for about 3-4 ms. The coil 52 through power connections 59 to the power connectors 153 can provide DC voltage of between 1-10V, typically about 5V, for between 2-10 ms, typically about 4 ms, to provide stable electronic operation.

As movement (rather than switch position) of the user input member 15 induces the electromotive force u, some embodiments of the present invention utilize the phase detection circuit 350 to selectively control transmission of different wireless control signals to the receiver circuit 500 of the receiver 200, to either connect or disconnect the load to or from the AC power source, based on electrical characteristics observed at the terminals 59 of the wire coil 52. FIG. 14 schematically illustrates a "close control" circuit 351 and an "open control" circuit 352 of the phase detection circuit 350. As noted above, the P+ connection 153 of the close control circuit 351 is connected to one of the two terminals of the wire coil 52, while the P− connection 153 of the open control circuit 352 is connected to the other of the two terminals of the wire coil 52. The close control circuit 351 and open control circuit 352 of the phase detection circuit 350 thus generate respective phase detection output signals ("Close_ctrl" and "Open_ctrl"), which are indicative of the voltage states of the first and second terminals of the wire coil 52 when the user input member 15 is in the first and second switch positions, respectively.

In greater detail, when the user input member 15 is in an ON switch position, the P+ terminal of the wire coil 52 has a high voltage state. The close control circuit 351 generates the "Close_ctrl" signal indicative of the high voltage state at the P+ terminal, and provides the "Close_ctrl" signal to an I/O pin of the processor 360. The processor 360 detects this high voltage state at the P+ terminal of the wire coil 52, and outputs a signal to the transmitter circuit 370 to transmit a first wireless control signal therefrom. Upon receipt of the first wireless control signal at the receiver 200, the processor 515 operates the relay control circuit 520 to control a relay K11 (FIG. 16) to close "line_output" and "line_input," thereby connecting the load to the AC power source.

On the other hand, when the user input member 15 is in an OFF switch position, the P− terminal of the coil 52 has a high voltage state. The open control circuit 352 generates the "Open_ctrl" signal indicative of the high voltage state at the P− terminal, and provides the "Open_ctrl" signal to an I/O pin of the processor 360. The processor 360 detects this high voltage state at the P− terminal of the wire coil 52, and outputs a signal to the transmitter circuit 370 to transmit a second wireless control signal therefrom. Upon receipt of the second wireless control signal at the receiver 200, the processor 515 operates the relay control circuit 520 to control the relay K11 (FIG. 16) to open "line_output" and "line_input," thereby disconnecting the load from the AC power source.

Accordingly, the processor 360 is configured to detect respective voltage states at first and second terminals of the wire coil 52 responsive to the outputs of the phase detection circuit 350, where the respective voltage states correspond to the respective switch positions of the user input member 15. The processor 360 is thus configured to operate the transmitter circuit 370 to selectively transmit a wireless control signal 220a (FIG. 9) to the remote receiver 200 to connect the load to the power source in response to detection of one of the respective voltage states, but not in response to detection of the other of the voltage states. Conversely, the processor 360 is configured to operate the transmitter circuit 370 to selectively transmit a different wireless control signal 220b (FIG. 9) to the remote receiver 200 to disconnect the load from the power source in response to detection of one of the respective voltage states, but not in response to detection of the other of the voltage states. That is, the voltage states of the first and second terminals 59 of the wire coil 52, as indicated by the output signals from the phase detection circuit 350, can be detected as an indicator of the respective switch positions.

The switch 10 can be provided as a single switch package or form factor or may be provided as a dual or triple side-by-side switch package (not shown). In some embodiments, the switch 10 can be configured as an in-wall mount single gang, dual gang or other multiple gang switch body. The permanent magnet 60 and/or coil 52 and shaft 55 can have a range of motion relative to each other that is sufficient to induce a voltage to power the transmitter for 1-10 ms, typically from 2-5 ms.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A self-powered switch, comprising:
 a switch housing comprising an externally accessible user input member, a coil assembly, and a permanent magnet arranged therein such that at least one of the coil assembly and the permanent magnet move relative to each other responsive to movement of the user input member between first and second switch positions; and
 a control circuit held in the switch housing and coupled to first and second terminals of the coil assembly, wherein the control circuit is configured to detect respective electrical characteristics of the first and second terminals of the coil assembly responsive to the movement of the user input member, and selectively transmit first and second wireless control signals to a remote receiver based on the respective electrical characteristics of the first and second terminals of the coil assembly, respectively.

2. The self-powered switch of claim 1, wherein the respective electrical characteristics comprise first and second voltage states of the first and second terminals of the coil assembly responsive to the movement of the user input member to the first and second switch positions, respectively,
 wherein the control circuit is configured to transmit the first wireless control signal in response to detection of the first voltage state at the first terminal, and transmit the second wireless control signal in response to detection of the second voltage state at the second terminal.

3. The self-powered switch of claim 1, wherein the control circuit comprises:
 a transmitter circuit configured for wireless communication with the remote receiver;
 a phase detection circuit coupled to the first and second terminals of the coil assembly and configured to generate first and second output signals responsive to the movement of the user input member to the first and second switch positions, respectively; and
 a processor coupled to the phase detection circuit and the transmitter circuit, wherein the processor is configured to detect the respective electrical characteristics of the first and second terminals of the coil assembly based on the first and second output signals from the phase detection circuit, respectively, and operate the transmitter circuit to transmit the first wireless control signal to the remote receiver for connecting a load thereof to a power source responsive to the first output signal, and to transmit the second wireless control signal to the remote receiver for disconnecting the load from the power source responsive to the second output signal.

4. The self-powered switch of claim 3, wherein the phase detection circuit comprises:
 a first circuit comprising a first capacitor coupled to the first terminal of the coil assembly and configured to generate the first output signal based on a first voltage state of the first capacitor responsive to the movement of the user input member to the first switch position; and
 a second circuit comprising a second capacitor coupled to the second terminal of the coil assembly and configured to generate the second output signal based on a second voltage state of the second capacitor responsive to the movement of the user input member to the second switch position.

5. The self-powered switch of claim 3, wherein the control circuit further comprises:
an energy harvesting circuit coupled to the first and second terminals of the coil assembly and comprising at least one capacitor that is configured to store a voltage sufficient to operate the transmitter circuit for wireless communication with the remote receiver responsive to the movement of the user input member to each of the first and second switch positions.

6. The self-powered switch of claim 1, wherein the coil assembly comprises a wire coil wound about a shaft that extends beyond the wire coil and towards the permanent magnet, and wherein the first and second terminals define opposite ends of the wire coil.

7. The self-powered switch of claim 6, wherein the permanent magnet is held between spaced apart first and second plates in the switch housing that extend beyond the permanent magnet and toward the coil assembly to define a cavity between inner surfaces thereof, and wherein an end of the shaft extends into the cavity and pivots to contact the inner surfaces of the first and second plates in response to movement of the user input member to the first and second switch positions, respectively.

8. The self-powered switch of claim 6, further comprising:
at least one circuit board including the control circuit thereon in the switch housing; and
a top member and a bottom member in the switch housing with the coil assembly held therebetween, wherein the top member comprises at least one coil terminal aperture through which the first and second terminals of the coil assembly extend to contact input terminals of the circuit board.

9. The self-powered switch of claim 1, further comprising:
a remote receiver housing that is distinct from the switch housing and comprising at least one relay therein that is configured to be connected to a power source; and
a receiving circuit held in the remote receiver housing and coupled to the at least one relay, wherein the receiving circuit is configured to receive the first and second wireless control signals from the control circuit and operate the at least one relay to connect and disconnect a load thereof to and from the power source responsive to the first and second wireless control signals, respectively.

10. A method of operating a control circuit for a self-powered switch comprising a coil assembly and a magnet configured to move relative to each other responsive to movement of a user input member, the method comprising:
detecting, by a processor, respective electrical characteristics of first and second terminals of the coil assembly responsive to the movement of the user input member; and
selectively transmitting, via a transmitter circuit coupled to the processor, first and second wireless control signals to a remote receiver based on the respective electrical characteristics of the first and second terminals of the coil assembly, respectively.

11. The method of claim 10, wherein the respective electrical characteristics comprise first and second voltage states of the first and second terminals of the coil assembly responsive to the movement of the user input member to first and second switch positions, respectively,
wherein selectively transmitting comprises:
transmitting, via the transmitter circuit coupled to the processor, the first wireless control signal in response to detection of the first voltage state at the first terminal; and
transmitting, via the transmitter circuit coupled to the processor, the second wireless control signal in response to detection of the second voltage state at the second terminal.

12. The method of claim 10, wherein detecting comprises:
receiving, from a phase detection circuit coupled to the processor, first and second output signals responsive to the movement of the user input member to the first and second switch positions, respectively; and
detecting, by the processor, the respective electrical characteristics of the first and second terminals of the coil assembly based on the first and second output signals from the phase detection circuit, respectively,
wherein selectively transmitting comprises:
transmitting, via the transmitter circuit coupled to the processor, the first wireless control signal to the remote receiver for connecting a load thereof to a power source responsive to the first output signal; and
transmitting, via the transmitter circuit coupled to the processor, the second wireless control signal to the remote receiver for disconnecting the load from the power source responsive to the second output signal.

13. The method of claim 12, further comprising:
generating, by the phase detection circuit, the first output signal based on a first voltage state of a first capacitor that is coupled to the first terminal of the coil assembly, responsive to the movement of the user input member to the first switch position; and
generating, by the phase detection circuit, the second output signal based on a second voltage state of the second capacitor coupled to the second terminal of the coil assembly, responsive to the movement of the user input member to the second switch position.

14. The method of claim 10, further comprising:
storing, in at least one capacitor of an energy harvesting circuit coupled to the first and second terminals of the coil assembly, a voltage sufficient to operate the transmitter circuit for wireless communication with the remote receiver responsive to the movement of the user input member to each of the first and second switch positions.

* * * * *